United States Patent
Goyal et al.

(10) Patent No.: US 9,225,671 B2
(45) Date of Patent: *Dec. 29, 2015

(54) AUTO MANAGEMENT OF A VIRTUAL DEVICE CONTEXT ENABLED NETWORK INFRASTRUCTURE

(75) Inventors: Ankur Goyal, Sunnyvale, CA (US); Samar Sharma, San Jose, CA (US); Manuwela Kanade, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 552 days.

This patent is subject to a terminal disclaimer.

(21) Appl. No.: 13/588,185

(22) Filed: Aug. 17, 2012

(65) Prior Publication Data

US 2014/0052843 A1  Feb. 20, 2014

(51) Int. Cl.
*G06F 15/177* (2006.01)
*H04L 12/931* (2013.01)
*H04L 12/24* (2006.01)
*H04L 12/28* (2006.01)

(52) U.S. Cl.
CPC ............ *H04L 49/70* (2013.01); *H04L 41/0893* (2013.01); *H04L 49/65* (2013.01); *H04L 12/2859* (2013.01); *Y02B 60/43* (2013.01)

(58) Field of Classification Search
USPC .......... 709/224, 223, 245, 227, 228, 229, 230
See application file for complete search history.

(56) References Cited

U.S. PATENT DOCUMENTS

| | | | |
|---|---|---|---|
| 2002/0165982 A1* | 11/2002 | Leichter et al. | 709/244 |
| 2007/0220124 A1 | 9/2007 | Golasky | |
| 2008/0049621 A1* | 2/2008 | McGuire et al. | 370/236.2 |
| 2008/0225864 A1* | 9/2008 | Aissaoui et al. | 370/401 |
| 2011/0318011 A1* | 12/2011 | Brassil | 398/82 |

OTHER PUBLICATIONS

International Search Report dated Jan. 2, 2014 cited in Application No. PCT/US2013/055131, 12 pgs.
"White Paper Technical Overview of Virtual Device Contexts," Jun. 1, 2013, 19 pgs., XP055086619, San Jose, CA, URL:http://www.cisco.com/en/US/prod/collateral/switches/ps9441/ps9402/ps9512/White_Paper_Tech_Overview_Virtual_Device_Contexts.pdf.
"Virtual Device Context Configuration Guide, Cisco DCNM for LAN, Release 5.x" dated Feb. 2012, 76 pages.

* cited by examiner

*Primary Examiner* — Lan-Dai T Truong
(74) *Attorney, Agent, or Firm* — Merchant & Gould P.C.

(57) ABSTRACT

In some embodiments, a virtual device context (vDC) domain may be advertised to other network devices. If at least a partition of each device is determined to belong to the same vDC domain, the network interface communicating with the at least one device may be activated.

12 Claims, 4 Drawing Sheets

AUTO MANAGEMENT OF A VIRTUAL DEVICE CONTEXT ENABLED NETWORK INFRASTRUCTURE

BACKGROUND

Virtual device context (vDC) features allow switches to be logically segmented into different virtual switches, or device contexts. The logical separation of single switch into multiple device contexts provides benefits such as administration and management separation, change and failure domain isolation from other virtual devices, and address and virtual network isolation. Conventional implementations, however, often place a burden on administrators to create the vDC, correctly allocate ports to the vDC, and ensure that cabling between vDCs is correct.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Figure 1:
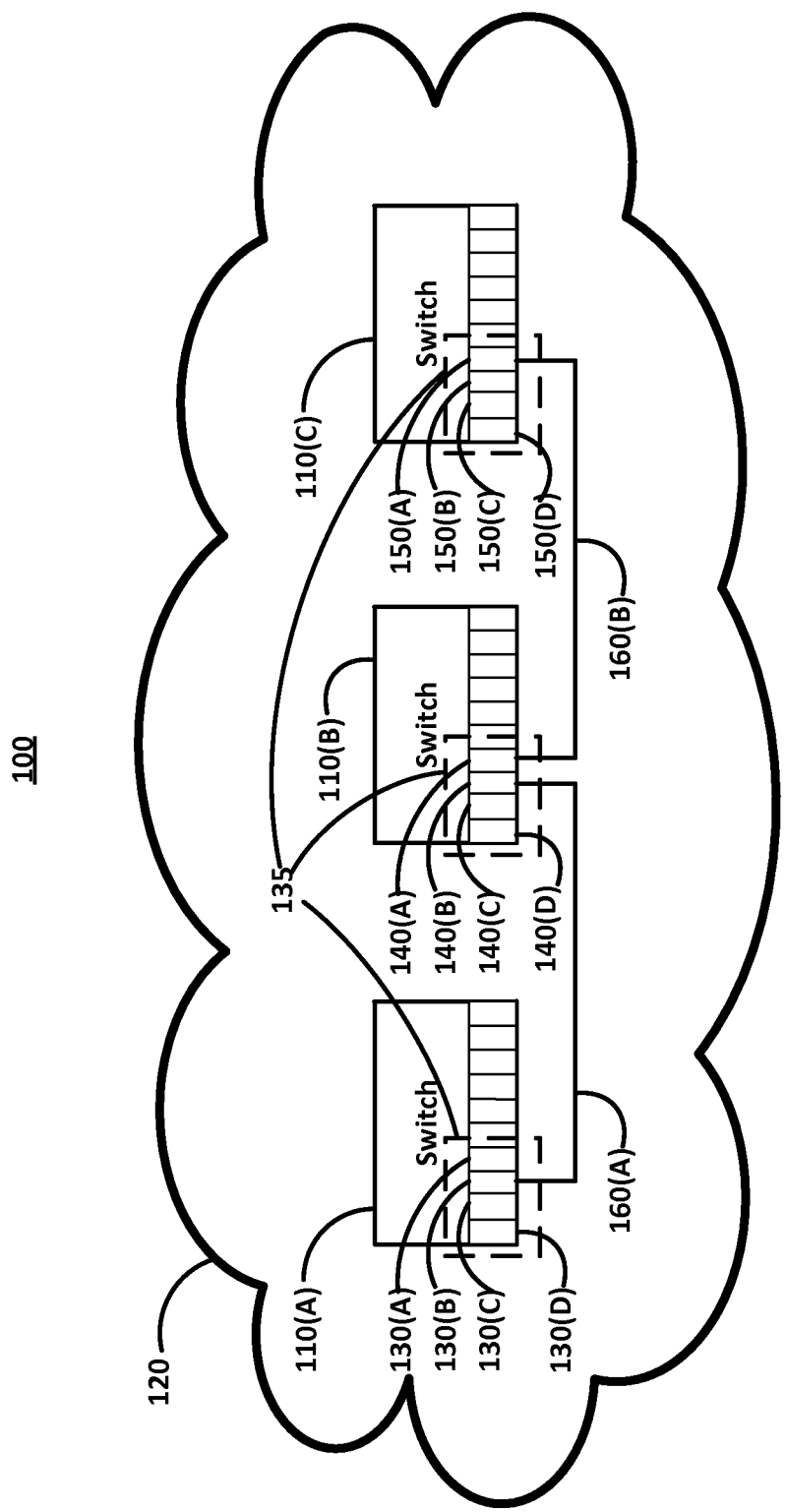
FIG. 1 is a block diagram of an operating environment.

Consistent with embodiments of the present disclosure, systems and methods are disclosed for providing automated management of virtual device contexts.

In some embodiments, a virtual device context (vDC) domain may be advertised to other network devices. If at least a partition of each device is determined to belong to the same vDC domain, the network interface communicating with the at least one device may be activated.

It is to be understood that both the foregoing general description and the following detailed description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the detailed description.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Virtual Device Contexts (vDCs) allow switches to be logically segmented into different virtual switches. That is, a single physical switch may have network traffic for one vDC isolated from network traffic associated with other vDCs. These vDCs may cross multiple physical switches, such that physical ports linked between each switch participate in the same vDC.

FIG. 1 is a block diagram view of an operating environment 100 for providing automated management of virtual device contexts. Operating environment 100 may comprise a plurality of switches 110(A)-(C) each participating in a communications network 120. Plurality of switches 110(A)-(D) may be further in communication with other network devices (not shown) such as end user devices (e.g., laptop and desktop computers), servers, routers, etc.

In order to create the physical partitions of a network with VDCs, an administrator first sets up the VDC in a first switch, such as switch 110(A), through a management console interface. The administrator identifies which ports of switch 110(A) will be associated with a vDC. For example, the administrator may assign a plurality of ports 130(A)-(D) on switch 110(A) to a first vDC 135. Multiple vDCs may be set up at the same time, with each port of switch 110(A) allocated to one of the vDCs. Each port can be allocated to only one vDC. In some network devices, ports may be arranged in groups that comprise multiple physical interfaces and each interface of a particular port group may need to be assigned to the same vDC. During setup, the administrator also assigns a domain to uniquely identify the vDC on switch 110(A).

Multiple switches may be configured to participate in the same vDC by assigning the same domain as vDCs are created on the other switches. Each switch may have ports assigned to the vDC as described above. For example, in FIG. 1, a second plurality of ports 140(A)-(D) of switch 110(B) and a third plurality of ports 150(A)-(D) of switch 110(C) may also be assigned to first vDC 135.

Once the switches are configured to use the vDC(s), the ports must be physically cabled together. At least one port from each switch participating in a given vDC needs to be connected to a port on at least one other switch participating in the vDC to establish connectivity. For example, port 130(B) may be connected, via a first network cable 160(A), to port 140(B) and port 140(A) may be connected, via a second network cable 160(B), to port 150(A). Switches 110(A)-(C) may then all communicate as part of the same vDC.

The cable connections between switches must conform to the vDC assignments, however. An error here can result in network traffic unintentionally leaking to other partitions of the network. Consistent with embodiments of this disclosure, the switches may perform automated testing to ensure that all ports are connected to devices associated with the same vDC. By defining the vDC domain during set up, the connections may be validated.

To validate the network connections, the network may be placed in a special mode. In this mode all of the switches in the network (e.g., switches 110(A)-(C) in network 120) are informed of the impending partitioning, such as by broadcasting a secure message to all of the switches. This mode may initiate a physical topology discovery, such as by launching a link layer discovery protocol (LLDP) physical topology discovery.

As physical interfaces are activated in each vDC, a link level protocol such as LLDP advertises the assigned vDC domain to the interface's peer connection. For example, activating port 130(B) may result in an LLDP message to port 140(B) advertising its participation in the domain of vDC 135. The interface may be placed in an operational state only if the vDC domain matches on both sides of the link. The interface may instead be disabled in case of a mismatch on the vDC domains.

Figure 2:
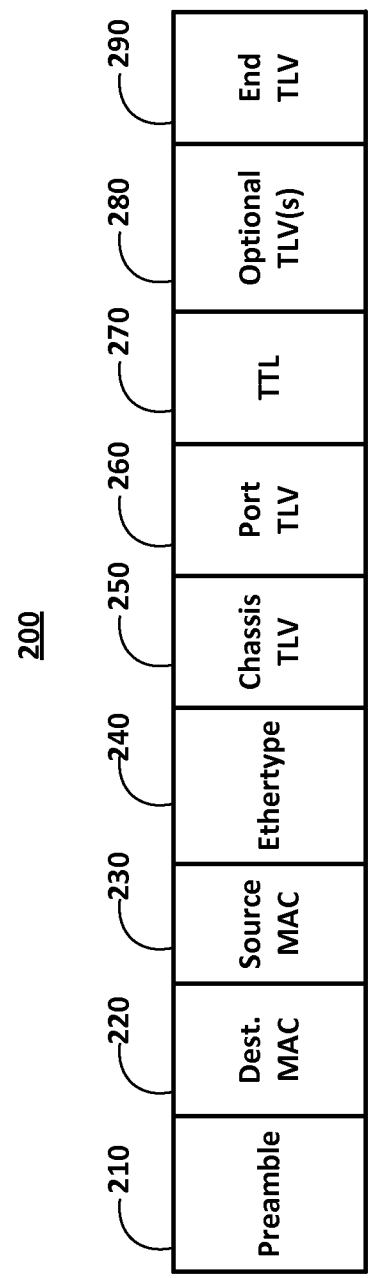
FIG. 2 is a block diagram illustrating a link layer discovery protocol frame.

FIG. 2 is a block diagram illustrating an LLDP frame 200. LLDP frames offer one way to advertise assigned vDC domains between ports, but this is only an example is not intended to limit the methods described in this disclosure. LLDP frame 200 may comprise an Ethernet frame comprising a preamble field 210, a destination MAC address field 220, a source MAC address field 230, an ethertype field 240, a chassis identifier type-length-value (TLV) field 250, a port identifier TLV field 260, a time-to-live (TTL) field 270, one and/or more optional TLV fields 280, and a frame end TLV 290.

A TLV comprises a data element comprising a binary code type indicating the kind of field, a length of the value section, and a variable-sized value section comprising the TLV's data. For example, chassis identifier TLV field 250 may have a type of 1, port identifier TLV field 260 may have a type of 2, time-to-live (TTL) field 270 may have a type of 3, and frame end TLV 290 may have a type and length of 0. Organizationally specific TLV fields 280 may use a type of 127 while the value segment starts with a 24-bit organizationally unique identifier and a 1 byte organizationally specific subtype followed by the data, in this case the advertised vDC domain.

Figure 3:
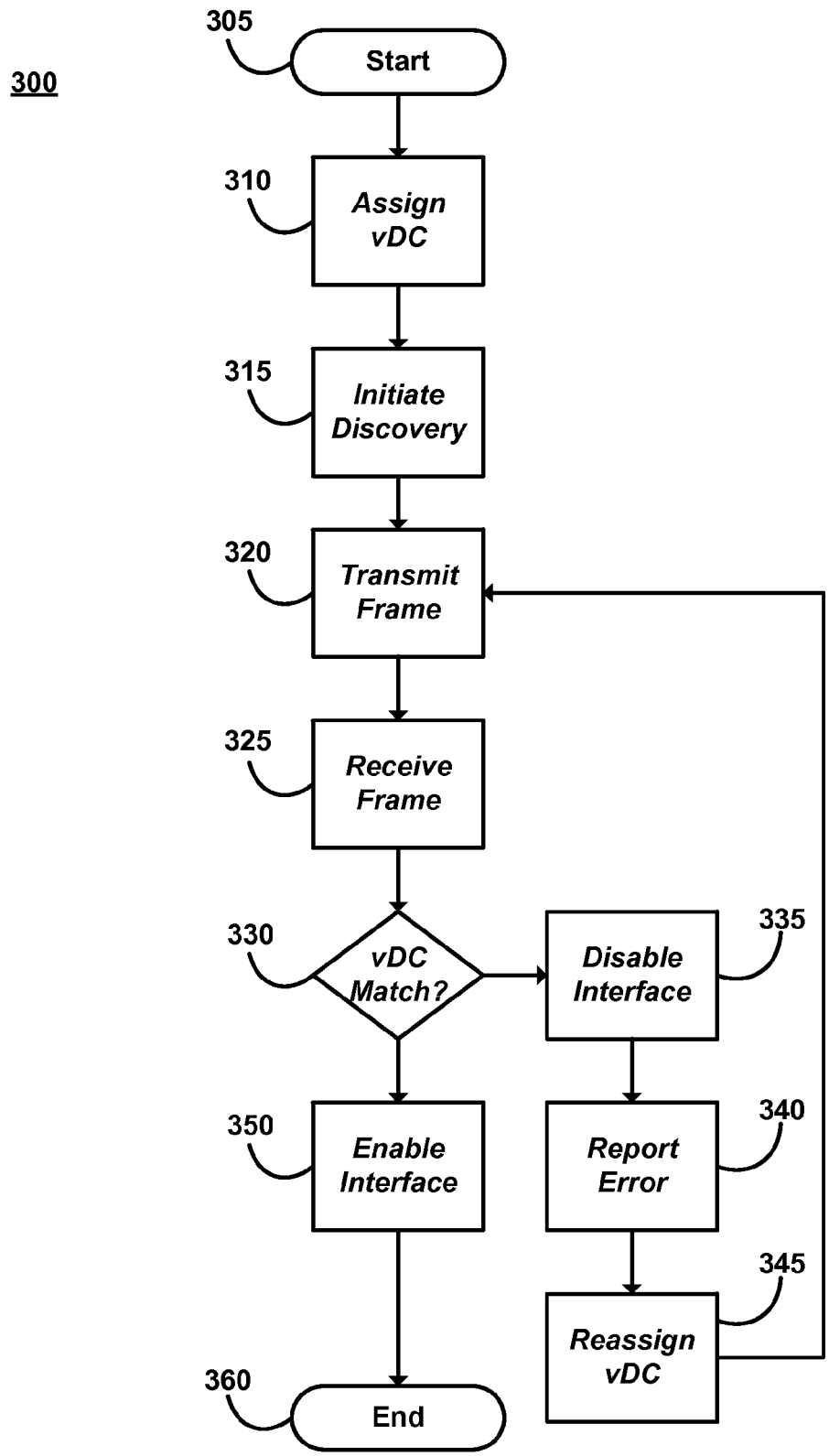
FIG. 3 is a flow chart illustrating a method for providing authoritative edge device synchronization.

FIG. 3 illustrates a flow chart setting forth the general stages involved in a method 300 consistent with an embodiment of the disclosure for providing automated management of virtual device contexts. Method 300 may be implemented using the components illustrated in operating environment 100 as described above. Ways to implement the stages of method 300 will be described in greater detail below. Method 300 begins at starting block 305 and proceeds to stage 310 where computing device 400 assigns a virtual device context (vDC) domain. For example, an administrator may use a management console on switch 110(A) to assign ports 130(A)-(D) to vDC 135 comprising a domain name of "vDC Alpha".

Method 300 then advances to stage 315 where computing device 400 initiates a network discovery. For example, switch 110(A) may initiate a network topology discovery via the link layer discovery protocol (LLDP). Consistent with embodiments of this disclosure, this discovery may occur on receipt of a command from an administrator and/or may be automatically initiated after a new vDC is assigned at stage 310. The initiation may take the form of a broadcast message to all devices connected to the same network as the initiating switch and may last for the duration of a time-to-live value included in the broadcast message.

Method 300 then advances to stage 320 where computing device 400 may transmit a frame advertising the assigned vDC. For example, port 130(B) may be assigned to vDC 135. An LLDP frame comprising the domain name (e.g., "vDC Alpha") as an optional type-length-value segment may be transmitted on port 130(B) to its peer port, port 140(B) on switch 110(B) in the arrangement described in FIG. 1.

Method 300 then advances to stage 325 where computing device 400 may receive a frame advertising a peer port's vDC. For example, port 130(B) may receive an LLDP frame comprising the domain name of the vDC assigned to port 140(B) as part of the network topology discovery initiated at stage 315. Consistent with embodiments of this disclosure, switch 110(A) may receive an LLDP frame advertising an assigned vDC even without the network discovery first being initiated. Switch 110(A) may then respond to the vDC advertising frame by transmitting a frame advertising the vDC assigned to the receiving port as described above with respect to stage 320.

Method 300 then advances to stage 330 where computing device 400 determines whether the vDC domain assigned to the port and the vDC domain advertised by the received frame match. For example, port 130(B) may be assigned to the "vDC Alpha" domain. When port 130(B) receives the frame from its peer port 140(B), switch 110(A) may determine whether the vDC domain advertised by the received frame is also the "vDC Alpha" domain.

If the vDCs do not match, method 300 advances to stage 335 where computing device 400 may disable the interface. For example, switch 110(A) may disable port 130(B) if the frame received by peer port 140(B) at stage 325 advertises a different vDC domain than that assigned to port 130(B). Disabling the network interface for that port ensures that no regular network data is transmitted on that port. The disabled port may, in at least some embodiments, still be permitted to send and receive LLDP network frames. This may allow the port to monitor the vDC mismatch and determine whether the assigned domains have been corrected.

After disabling the interface, method 300 advances to stage 340 where computing device 400 may report the error. For example, switch 110(A) may display an error identifying the disabled port in a log and/or error viewing interface of the switch's management console.

Method 300 may then advance to stage 345 where computing device 400 may re-assign the vDC domain for the disabled port. For example, an administrator may re-configure the domain assigned to the disabled port on switch 110(A) to match the assigned domain of its peer port. Upon re-assigning the vDC domain, switch 110(A) may return to stage 320 and transmit another LLDP frame advertising the newly assigned vDC domain.

If the vDC domains match at stage 330, method 300 then advances to stage 350 where computing device 400 enables the network interface of the port. For example, switch 110(A) may permit port 130(B) and 140(B) to begin and/or resume exchanging network data associated with network devices within the assigned vDC. Method 300 then ends at stage 360.

Figure 4:
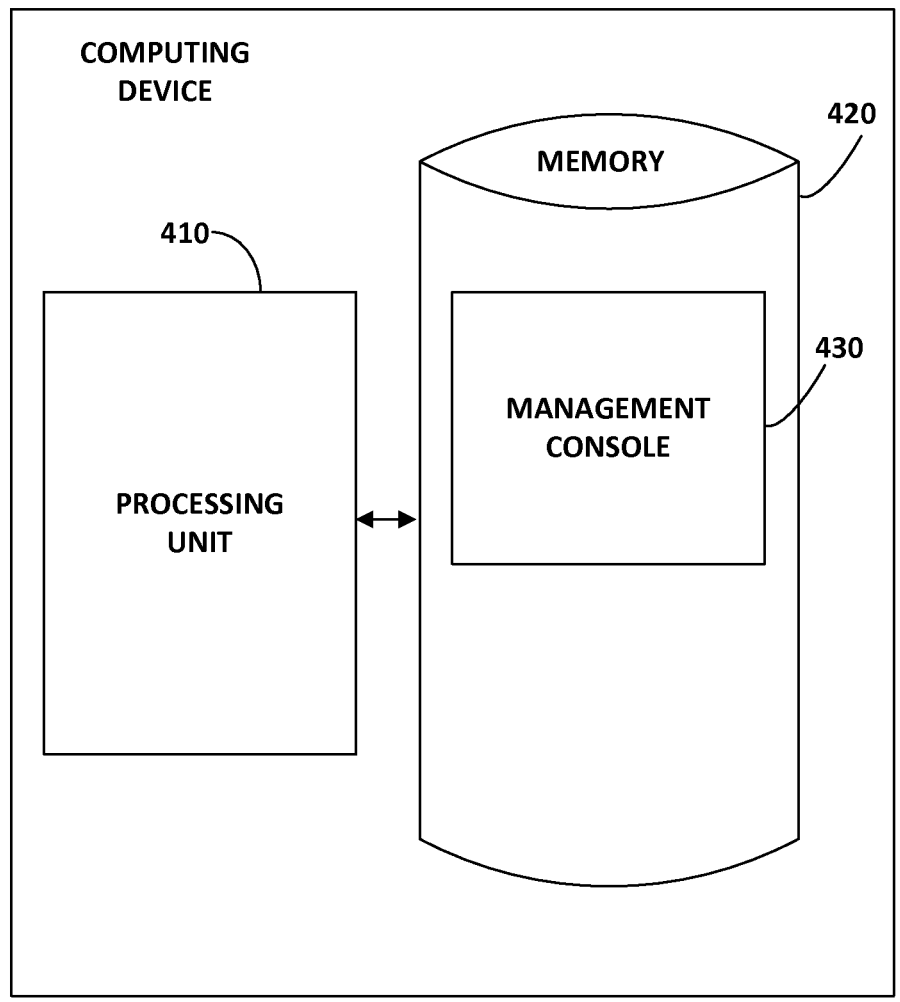
FIG. 4 is a block diagram illustrating components of a computing device.

FIG. 4 illustrates computing device 400 comprising a processing unit 410 and a memory unit 420. Memory 420 may include a executable software to provide a management console 430 that may allow users to configure computing device 400 and/or view information such as logs and errors. While executing on processing unit 410, these and other software modules and/or data sources may perform processes for providing redundancy elimination in web caching, for example, via one or more stages included in method 300 described above with respect to FIG. 3. Moreover, any one or more of the stages included in method 300 may be performed on any element shown in operating environment 100 and each of the elements illustrated in operating environment 100 may comprise a similar computing device to that illustrated by FIG. 4.

Computing device 400 may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. An apparatus comprising:
   a plurality of network interfaces;
   a memory storage; and
   a processor coupled to the memory storage, wherein the processor is configured to:
      receive, on at least one network interface of the plurality of network interfaces, a first network topology discovery frame advertising a virtual domain context (vDC) domain,
      transmit a second network topology discovery frame comprising an assigned vDC domain associated with the at least one network interface,
      determine whether the advertised vDC domain matches the assigned vDC domain for the at least one network interface, and
      in response to determining that the advertised vDC domain does not match the assigned vDC domain for the at least one network interface:
         deactivate the at least one network interface; and
         report an error associated with the at least one network interface to a management console associated with the apparatus.

2. The apparatus of claim 1, wherein the processor is configured to:
   receive a new vDC domain assignment for at least one second network interface of the plurality of network interfaces; and
   in response to receiving the new vDC domain assignment, transmit a third network topology discovery frame advertising the new vDC domain on the at least one second network interface.

3. The apparatus of claim 1, wherein the first network topology discovery frame comprises a link layer discovery protocol (LLDP) frame.

4. The apparatus of claim 3, wherein the first network topology discovery frame comprises the advertised vDC domain as a value in an optional type-length-value (TLV) segment of the LLDP frame.

5. A method comprising:
   receiving, on at least one network interface of a plurality of network interfaces, a first network topology discovery frame advertising a virtual domain context (vDC) domain;
   transmitting a second network topology discovery frame comprising an assigned vDC domain associated with the at least one network interface;
   determining whether the advertised vDC domain matches the assigned vDC domain for the at least one network interface; and
   in response to determining that the advertised vDC domain does not match the assigned vDC domain for the at least one network interface;
      deactivating the at least one network interface, and
      reporting an error associated with the at least one network interface to a management console associated with the apparatus.

6. The method of claim 5, further comprising:
   receiving a new vDC domain assignment for at least one second network interface of the plurality of network interfaces; and
   in response to receiving the new vDC domain assignment, transmitting a third network topology discovery frame advertising the new vDC domain on the at least one second network interface.

7. The method of claim 5, wherein receiving the first network topology discovery frame comprises receiving the first network topology discovery frame comprising a link layer discovery protocol (LLDP) frame.

8. The method of claim 7, wherein receiving the first network topology discovery frame comprises receiving the first network topology discovery frame comprising the advertised vDC domain as a value in an optional type-length-value (TLV) segment of the LLDP frame.

9. A non-transitory computer-readable medium that stores a set of instructions which when executed perform a method executed by the set of instructions comprising:
   receiving, on at least one network interface of a plurality of network interfaces, a first network topology discovery frame advertising a virtual domain context (vDC) domain;
   transmitting a second network topology discovery frame comprising an assigned vDC domain associated with the at least one network interface;
   determining whether the advertised vDC domain matches the assigned vDC domain for the at least one network interface; and
   in response to determining that the advertised vDC domain does not match the assigned vDC domain for the at least one network interface;
      deactivating the at least one network interface, and reporting an error associated with the at least one network interface to a management console associated with the apparatus.

10. The non-transitory computer-readable medium of claim 9, further comprising:
receiving a new vDC domain assignment for at least one second network interface of the plurality of network interfaces; and
in response to receiving the new vDC domain assignment, transmitting a third network topology discovery frame advertising the new vDC domain on the at least one second network interface.

11. The non-transitory computer-readable medium of claim 9, wherein receiving the first network topology discovery frame comprises receiving the first network topology discovery frame comprising a link layer discovery protocol (LLDP) frame.

12. The non-transitory computer-readable medium of claim 11, wherein receiving the first network topology discovery frame comprises receiving the first network topology discovery frame comprising the advertised vDC domain as a value in an optional type-length-value (TLV) segment of the LLDP frame.

* * * * *